United States Patent
Goli et al.

(10) Patent No.: US 10,794,306 B2
(45) Date of Patent: Oct. 6, 2020

(54) EXHAUST TEMPERATURE MAINTENANCE USING A PARASITIC LOAD

(71) Applicant: Caterpillar Inc., Deerfield, IL (US)

(72) Inventors: Suman Goli, Edwards, IL (US); SriVidya Lavanya Kamisetty, Brookfield, WI (US)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 16/258,013

(22) Filed: Jan. 25, 2019

(65) Prior Publication Data

US 2020/0240336 A1    Jul. 30, 2020

(51) Int. Cl.
| | |
|---|---|
| *B60T 7/12* | (2006.01) |
| *F02D 41/00* | (2006.01) |
| *F02B 37/00* | (2006.01) |
| *B60W 20/11* | (2016.01) |
| *F02D 21/08* | (2006.01) |
| *F02M 26/63* | (2016.01) |
| *F02M 26/10* | (2016.01) |

(52) U.S. Cl.
CPC ......... *F02D 41/0052* (2013.01); *B60W 20/11* (2016.01); *F02B 37/001* (2013.01); *F02D 21/08* (2013.01); *F02M 26/10* (2016.02); *F02M 26/63* (2016.02)

(58) Field of Classification Search
CPC .... F02D 41/0052; F02D 21/08; B60W 20/11; F02B 37/001; F02M 26/10; F02M 26/63
USPC ........................................................ 701/108
See application file for complete search history.

(56) References Cited

U.S. PATENT DOCUMENTS

| | | | | |
|---|---|---|---|---|
| 5,307,632 | A * | 5/1994 | Gottemoller | F02B 37/105 60/608 |
| 5,526,645 | A * | 6/1996 | Kaiser | F02D 19/105 123/564 |
| 6,314,727 | B1 * | 11/2001 | Prabhu | E02F 9/2235 60/431 |
| 6,463,907 | B1 * | 10/2002 | Hiltner | F02B 1/12 123/27 R |
| 7,467,033 | B2 * | 12/2008 | Miller | B60K 6/445 701/22 |
| 8,091,346 | B2 * | 1/2012 | Kapparos | F01N 3/0256 60/286 |
| 8,326,499 | B2 * | 12/2012 | Sopko, Jr. | B60W 10/06 123/320 |

(Continued)

FOREIGN PATENT DOCUMENTS

| | | |
|---|---|---|
| GB | 2500923 | 10/2013 |
| WO | 2009055060 | 4/2009 |

*Primary Examiner* — Hung Q Nguyen
*Assistant Examiner* — Anthony Donald Taylor, Jr.
(74) *Attorney, Agent, or Firm* — Harrity & Harrity LLP

(57) ABSTRACT

A power system is disclosed. The power system may include one or more memories and a controller. The controller may determine an exhaust temperature of an engine associated with a continuously variable transmission or a hybrid transmission. The controller may determine a target increase to the exhaust temperature based on the exhaust temperature failing to satisfy a threshold. The controller may determine, based on a lookup table, a target increase to a torque output of the engine based on the target increase to the exhaust temperature. The controller may cause a parasitic torque of the engine to be increased based on the target increase to the torque output.

20 Claims, 4 Drawing Sheets

(56) References Cited

U.S. PATENT DOCUMENTS

| | | | | |
|---|---|---|---|---|
| 8,549,838 B2* | 10/2013 | Sujan | ................... | B60W 10/06 |
| | | | | 180/65.265 |
| 9,982,637 B2* | 5/2018 | Gokhale | ................ | F02M 26/05 |
| 10,208,455 B2* | 2/2019 | Fleischmann | ......... | B60W 10/10 |
| 2004/0172935 A1* | 9/2004 | Otake | ..................... | F01N 3/023 |
| | | | | 60/295 |
| 2007/0044453 A1* | 3/2007 | Strauser | ................ | F01N 3/0256 |
| | | | | 60/286 |
| 2012/0045378 A1* | 2/2012 | Soukhojak | ............ | F01N 3/2066 |
| | | | | 423/212 |
| 2015/0000630 A1* | 1/2015 | Coldren | ............. | F02D 41/0087 |
| | | | | 123/304 |
| 2015/0143802 A1* | 5/2015 | Huhn | ..................... | F01N 9/002 |
| | | | | 60/311 |

* cited by examiner

EXHAUST TEMPERATURE MAINTENANCE USING A PARASITIC LOAD

TECHNICAL FIELD

The present disclosure relates generally to a power system and, more particularly, to exhaust temperature maintenance using a parasitic load.

BACKGROUND

Machines, such as wheel loaders, dozers, and other heavy equipment, are used to perform many tasks. To effectively perform these tasks, the machines require an engine that provides significant torque through a transmission to one or more tires. One type of engine is the internal combustion engine. In an internal combustion engine, exhaust gas recirculation (EGR) is an emissions reduction technique that may be used in gasoline and diesel engines. EGR works by recirculating a portion of an engine's exhaust gas back to the engine cylinders, which may reduce harmful emissions by reducing the peak combustion temperature of the engine. Many diesel engines are associated with a diesel oxidation catalyst (DOC). The DOC may be used to control diesel particulate emissions and/or as an auxiliary catalyst for a diesel particulate filter (DPF) or another type of particulate filter. In some cases, the DOC may provide regeneration of the DPF, meaning that particulate matter of the DPF may be removed or destroyed with the assistance of the DOC. For example, the DOC may promote DPF regeneration by oxidizing soot of the DPF using the heat from engine exhaust. Under certain operating conditions (e.g., when torques are small, when environmental temperatures are low, and/or the like), an exhaust temperature of the engine may fall below a threshold required to provide DPF regeneration.

One attempt to maintain an exhaust temperature to provide DPF regeneration is disclosed in U.S. Pat. No. 7,467,033 that issued to MILLER et al. on Mar. 7, 2005 ("the '033 patent"). In particular, the '033 patent discloses "a control method . . . for maintaining a calibrated minimum load for an engine." In the '033 patent, "a minimum engine torque adder, which is calibrated as a torque ramp rate, is used to adjust the allowable torque limit when it is added to the engine torque if the measured engine load is near a calibrated minimum engine load for a given engine speed. As a result of controlling the engine in this fashion, engine fuel combustion stability is maintained and undesirable engine exhaust gas temperature is avoided during a prolonged engine operation at low load."

While the control method of the '033 patent may disclose a method for maintaining a calibrated minimum load for an engine, the '033 patent does not disclose using a parasitic load of the engine to maintain the minimum load. Furthermore, the '033 patent does not disclose the determination of the minimum load based on an exhaust temperature.

The system of the present disclosure solves one or more of the problems set forth above and/or other problems in the art.

SUMMARY

According to some implementations, the present disclosure is related to a method. The method may comprise determining, by a controller, an exhaust temperature of an engine associated with a continuously variable transmission (CVT) or a hybrid transmission. The method may comprise determining, by the controller, a target increase to the exhaust temperature based on the exhaust temperature failing to satisfy a threshold. The method may comprise determining, by the controller, a target increase to a torque output of the engine based on the target increase to the exhaust temperature. The method may comprise causing, by the controller, a parasitic torque of the engine to be increased based on the target increase to the torque output.

According to some implementations, the present disclosure is related to a device comprising one or more memories and a controller. The controller may determine an exhaust temperature of an engine associated with a CVT or a hybrid transmission. The controller may determine a target increase to the exhaust temperature based on the exhaust temperature failing to satisfy a threshold. The controller may determine, based on a lookup table, a target increase to a torque output of the engine based on the target increase to the exhaust temperature. The controller may cause a parasitic torque of the engine to be increased based on the target increase to the torque output.

According to some implementations, the present disclosure is related to a system comprising an engine, an electrohydraulic pump, and a controller. The controller may determine an exhaust temperature of the engine. The controller may determine a target increase to a torque output of the engine based on the exhaust temperature failing to satisfy a threshold, wherein the target increase to the torque output is based on a difference between the exhaust temperature and the threshold. The controller may cause a parasitic torque of the engine to be increased to satisfy the target increase to the torque output using the electrohydraulic pump.

DETAILED DESCRIPTION

Some implementations described herein relate to various machines, such as a wheel loader, a bus, an on- or off-highway haul truck, or any other type of machine.

Figure 1:
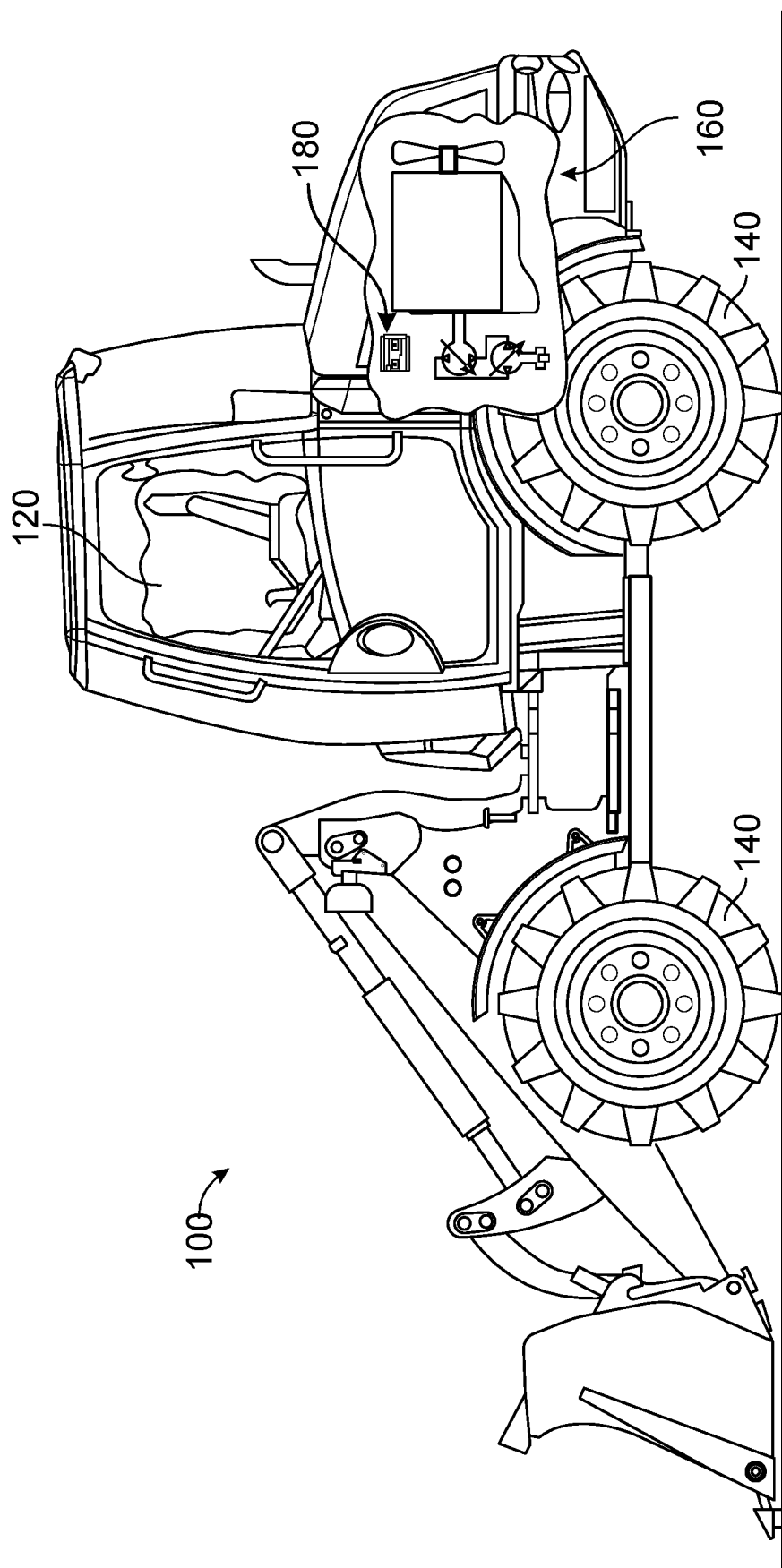
FIG. 1 is diagram of an example machine described herein.

FIG. 1 is a diagram of an example machine 100 described herein. For example, machine 100 may include a mobile machine such as the wheel loader shown in FIG. 1, a bus, an on- or off-highway haul truck, or any other type of mobile machine. Machine 100 may include an operator station 120, one or more traction devices 140 (sometimes referred to as ground engagements), a powertrain 160 operatively connected to drive at least one of traction devices 140, and a controller 180 connected to one or more other components of machine 100. The controller 180 may perform operations related to exhaust temperature management using a parasitic load, as described in more detail elsewhere herein.

As indicated above, FIG. 1 is provided as an example. Other examples may differ from what is described in connection with FIG. 1.

Figure 2:
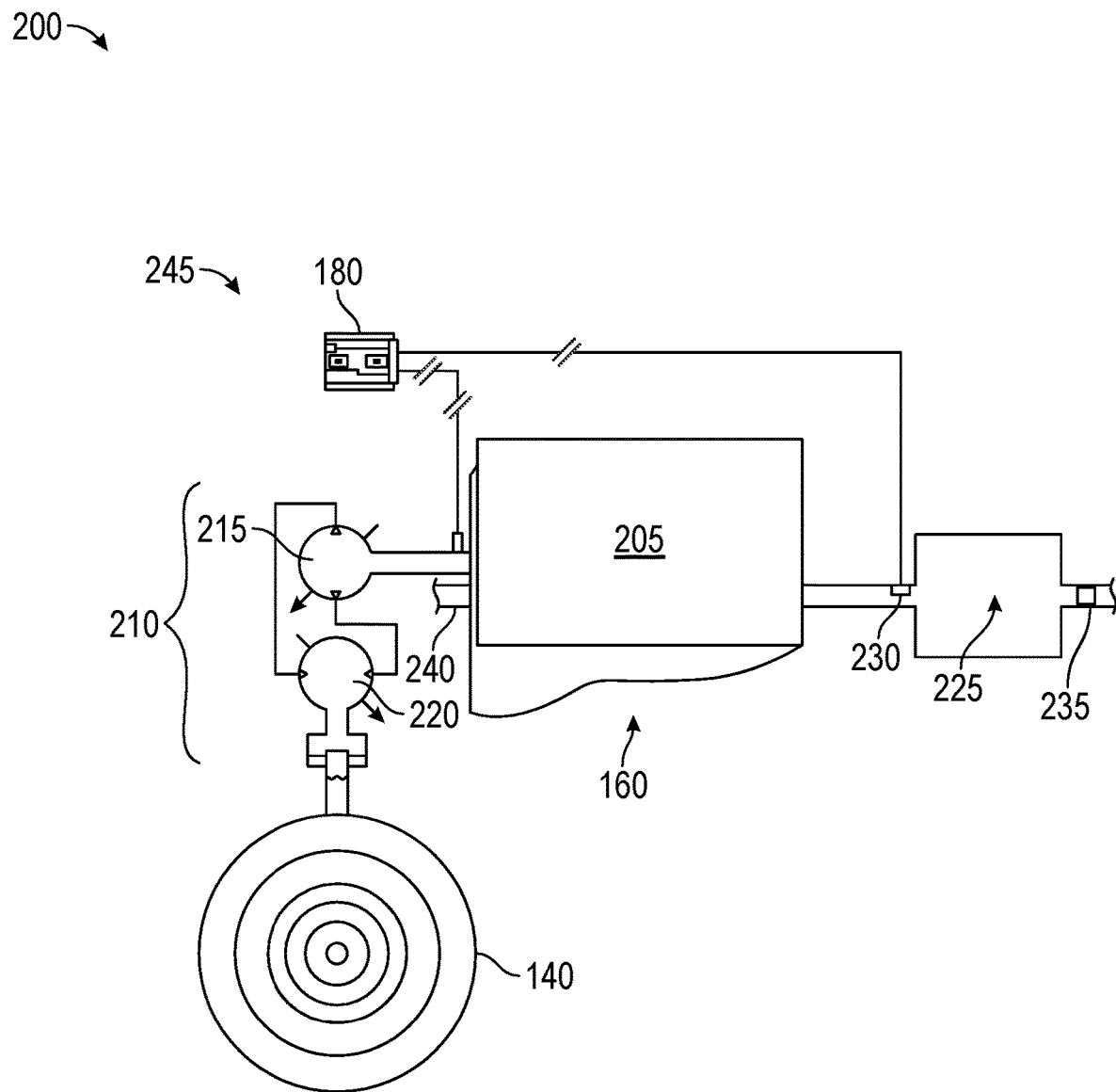
FIG. 2 is a diagram of an example transmission system for a machine described herein.

FIG. 2 is a diagram of an example transmission system 200 for a machine 100 described herein.

As shown in FIG. 2, powertrain 160 may be configured to generate and transmit power to traction devices 140. In particular, powertrain 160 may include an engine 205 that generates a power output, a transmission 210 to receive the power output and transmit the power output to traction devices 140, and a controller 180 configured to regulate the operation of engine 205 and transmission 210 based on one or more inputs (e.g., based on inputs from sensor 230 or an operator input).

Engine 205 may include an internal combustion engine that produces mechanical and/or electrical power output. For the purposes of this disclosure, engine 205 is shown and described as a four-stroke diesel engine. In some implementations, engine 205 may be any other type of internal combustion engine such as, for example, a gasoline or a gaseous fuel-powered engine. The subsystems of engine 205 may include, for example, a fuel system, an air induction system, an exhaust system (e.g., DOC 225), a lubrication system, a cooling system, and/or the like. Engine 205 may be configured to produce a torque output directed to transmission 210 and to other parasitic loads (e.g., to hydraulic systems, electrical systems, cooling systems, etc.) through a range of speeds.

DOC 225 includes an oxidation device. DOC may receive an exhaust flow from engine 205 at an inlet of DOC 225. In some cases, DOC 225 may be associated with a particulate filter 235, such as a DPF. For example, the particulate filter 235 may be provided downstream of DOC 225. The particulate filter 235 may be heated by the exhaust flow from engine 205, thereby thermally aging or oxidizing particulate matter (e.g., soot) deposited in the particulate filter 235 when the exhaust flow is of a sufficient temperature. DOC 225 may be associated with a sensor 230. Sensor 230 may be a temperature sensor. Sensor 230 may be provided upstream of DOC 225 (e.g., at an inlet of DOC 225), downstream of DOC 225 (e.g., at an outlet of DOC 225), within DOC 225, and/or the like. In some implementations, DOC 225 may include a selective catalytic reducer (SCR).

Transmission 210 includes, for example, a continuously variable transmission (CVT), a hybrid transmission, and/or the like. Transmission 210 may be any type of continuously variable transmission, such as a hydraulic CVT, a hydromechanical CVT, an electric CVT, and/or the like.

Transmission 210 may include a driving element 215 and a driven element 220 that is powered by driving element 215. In the example hydraulic CVT of FIG. 2, driving element 215 is a pump, such as a variable displacement hydraulic pump, and driven element 220 is a motor, such as a variable displacement hydraulic motor configured to receive pressurized fluid from driving element 215. Driving element 215 may be connected to drive driven element 220 with pressurized fluid via one or more conduits based on a torque command directed to driving and/or driven elements 215, 220 by controller 180. In some situations, driven element 220 may alternatively drive driving element 215 in reverse direction, for example during a braking event.

In some implementations, transmission 210 may be an electric CVT. In this configuration, driving element 215 may be a generator driven by engine 205, and driven element 220 may be a motor mechanically connected to traction device 140 and configured to receive electricity produced by the generator. The motor of the electric configuration may be powered by the generator based on a torque command from controller 180.

In some instances, the torque command directed to transmission 210 may change without a corresponding change in an operator input. For example, when traveling at steady state, machine 100 could encounter a hill and begin to speed up or slow down. In either of these situations, controller 180 may sense the change in speed and adjust the torque command directed to transmission 210 to maintain the desired speed.

As a ratio of transmission 210 is adjusted based on the torque command from controller 180, transmission 210 may draw varying amounts of torque from engine 205. In order to ensure that an adequate supply of power is always available to transmission 210 for unanticipated conditions, engine 205 may be capable of generating more torque at a given speed (e.g., stroke rate) than what is immediately required by transmission 210. Some of this torque may be provided to a parasitic load 240 based on a command from controller 180. Parasitic load 240 may include, for example, an electrohydraulic pump, an implement pump, an external load, an alternator, an air conditioner, and/or the like. Torque that is provided for parasitic load 240 may be referred to herein as parasitic torque. An implement may be coupled to parasitic load 240.

Controller 180 includes a central processing unit (CPU), a microprocessor, a microcontroller, a control unit, an engine control unit, a processor, or another type of processing component. In some implementations, controller 180 includes one or more processors capable of being programmed to perform a function. Controller 180 may include a memory, such as a random access memory (RAM), a read only memory (ROM), and/or another type of dynamic or static storage device (e.g., a flash memory, a magnetic memory, and/or an optical memory) that stores information and/or instructions for use by controller 180.

One or more of the parts of transmission system 200 may be referred to as a system 245. For example, system 245 may include one or more of controller 180, engine 205, transmission 210, DOC 225, sensor 230, and parasitic load 240. The system 245 may perform one or more of the operations described herein.

As indicated above, FIG. 2 is provided as an example. Other examples may differ from what is described in connection with FIG. 2.

Figure 3:
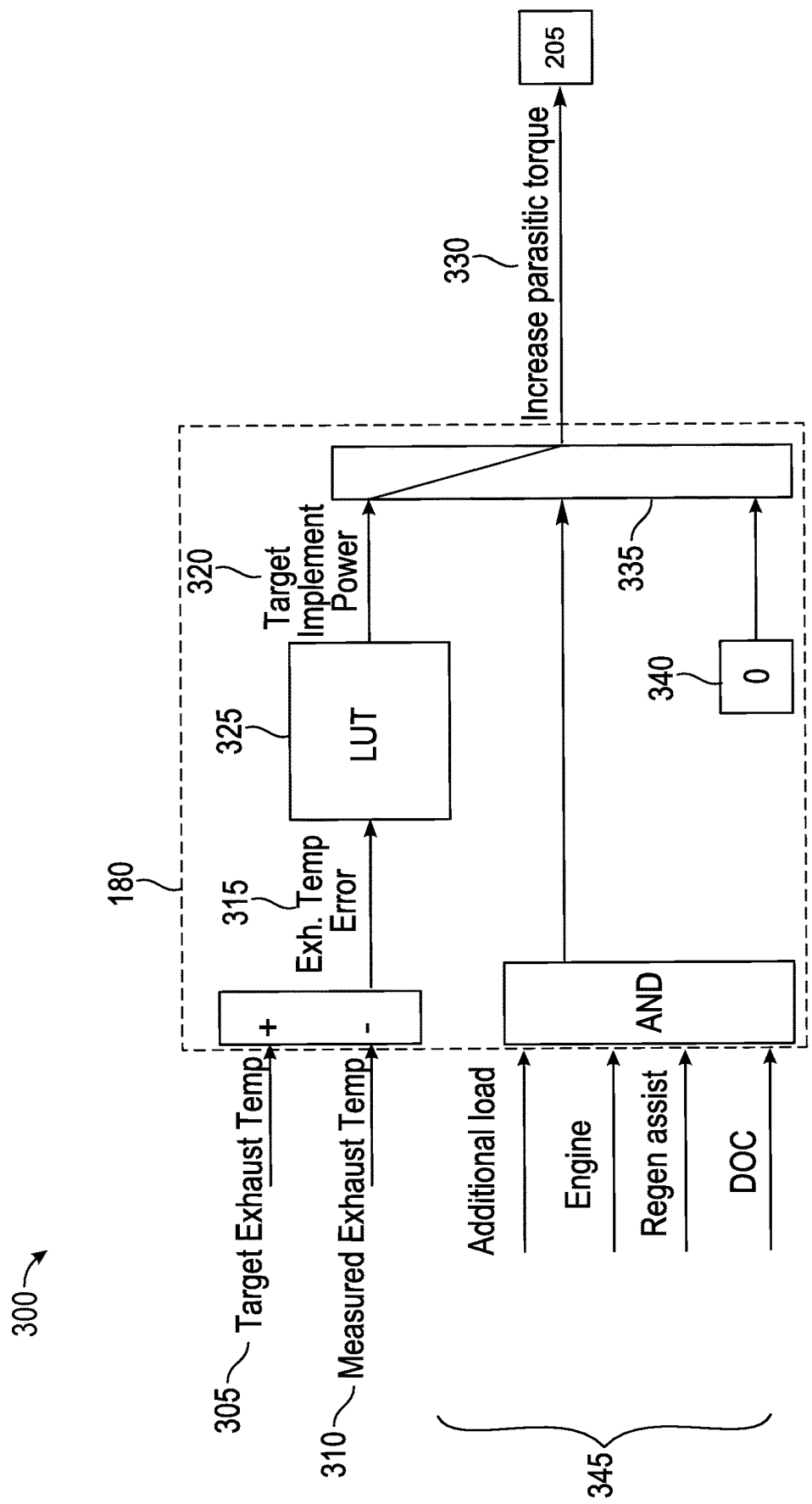
FIG. 3 illustrates an example logical diagram for exhaust temperature maintenance using a parasitic load, as described herein.

FIG. 3 illustrates an example logical diagram 300 for exhaust temperature maintenance using a parasitic load, as described herein. The operations described in connection with logical diagram 300 may be performed by controller 180.

As shown, controller 180 may receive information identifying a target exhaust temperature 305. This target exhaust temperature may be referred to herein as a threshold. As one example, the target exhaust temperature may be approximately 290 degrees Celsius (C) or in a range of approximately 280 to 320 degrees C. As shown, controller 180 may receive information identifying a measured exhaust temperature 310, which may in some cases be referred to herein as an exhaust temperature. For example, controller 180 may receive the information identifying the measured exhaust temperature 310 from sensor 230 and/or the like.

As shown, controller 180 may determine an exhaust (Exh.) temperature error 315 (e.g., a target increase to the measured exhaust temperature). For example, controller 180 may determine that the information identifying the measured exhaust temperature 310 fails to satisfy the threshold identified by the information identifying the target exhaust temperature 305. Accordingly, controller 180 may determine a target implement power 320. Controller 180 may determine the target implement power 320 using a look up table 325. For example, look up table 325 may identify exhaust temperature errors and corresponding target implement powers. As shown, controller 180 may provide a command 330 to engine 205 to cause a parasitic torque of the implement to be increased based on the target implement power 320 (e.g., to match the target implement power 320). For example, the command 330 may indicate to increase a stroke rate of a pump associated with the implement. In some implementations, controller 180 may provide the command 330 or a related command to transmission 210.

In some cases, controller 180 may determine whether the exhaust temperature maintenance process is to be performed based on a selector 335. For example, selector 335 may determine whether the exhaust temperature maintenance process is to be performed, or whether no action is to be taken (indicated by reference number 340) based on a set of conditions 345. Here, the set of conditions includes a first condition that engine 205 has requested regeneration using the parasitic load, a second condition that engine 205 is operational, a third condition that regen assist is enabled, and a fourth condition that the DOC is operational (e.g., not associated with an error state). When each condition of the set of conditions 345 is satisfied, controller 180 may cause the exhaust temperature to be managed using the parasitic torque.

Figure 4:
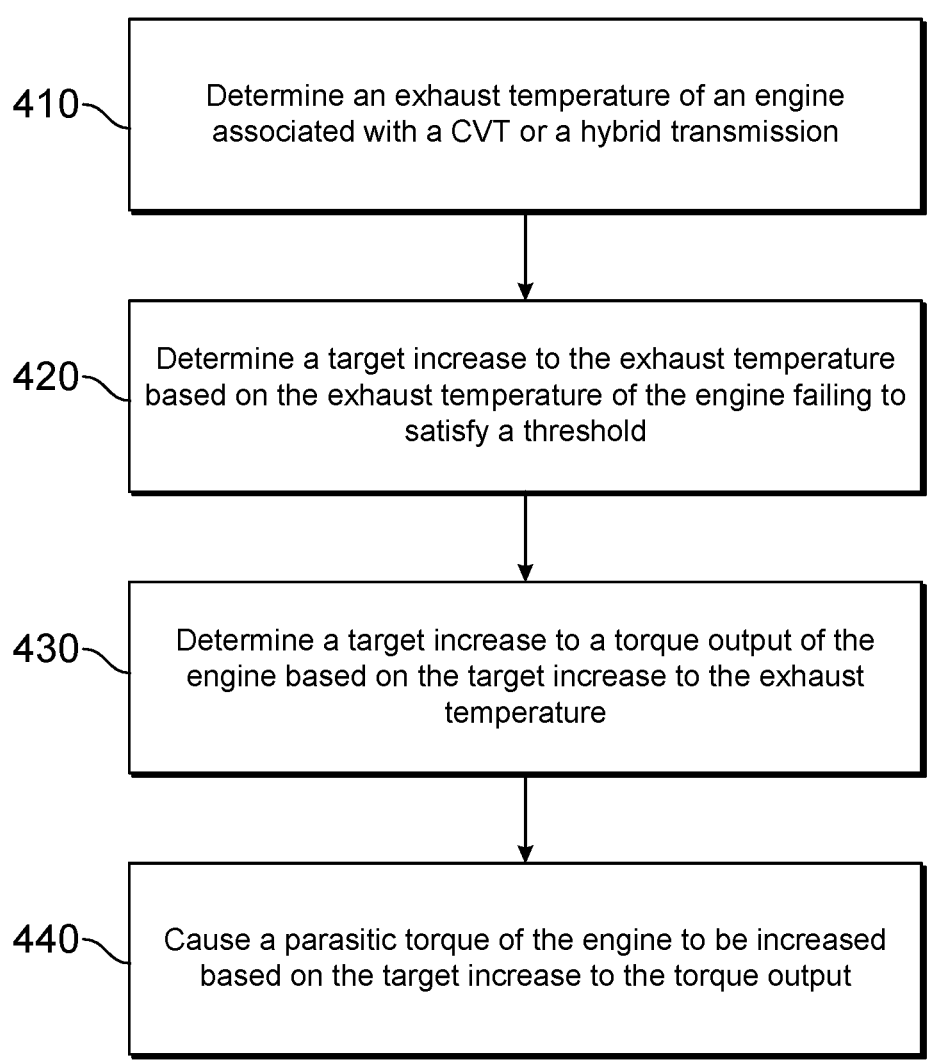
FIG. 4 is a flow chart of an example process for exhaust temperature maintenance using a parasitic load.

FIG. 4 is a flow chart of an example process 400 for exhaust temperature maintenance using a parasitic load. One or more process blocks of FIG. 4 may be performed by a controller (e.g., controller 180). Additionally, or alternatively, one or more process blocks of FIG. 4 may be performed by another device or a group of devices separate from or including the controller, such as a sensor (e.g., sensor 230), a parasitic load (e.g., parasitic load 240), and/or the like.

As shown in FIG. 4, process 400 may include determining an exhaust temperature of an engine associated with a CVT or a hybrid transmission (block 410). For example, the controller may determine the exhaust temperature (e.g., information identifying a measured exhaust temperature 310) using a sensor (e.g., sensor 230), as described above. The exhaust temperature may be measured at a diesel oxidation catalyst or a selective catalytic reducer (e.g., DOC 225) associated with the engine.

As further shown in FIG. 4, process 400 may include determining a target increase to the exhaust temperature based on the exhaust temperature of the engine failing to satisfy a threshold (block 420). For example, the controller may determine a target increase to the exhaust temperature (e.g., exhaust temperature error 315) based on the exhaust temperature of the engine failing to satisfy a threshold (e.g., information identifying a target exhaust temperature 305).

As further shown in FIG. 4, process 400 may include determining a target increase to a torque output of the engine based on the target increase to the exhaust temperature (block 430). For example, the controller may determine a target increase to a torque output of the engine (e.g., a target implement power 320) based on the target increase to the exhaust temperature, as described above. The controller may perform this determination using a look up table (e.g., look up table 325). In some cases, the controller may determine the target increase to the torque output or the target increase to the exhaust temperature based on an indication to increase the exhaust temperature or load of the engine (e.g., one or more of the set of conditions 345).

As further shown in FIG. 4, process 400 may include causing a parasitic torque of the engine to be increased based on the target increase to the torque output (block 440). For example, the controller 180 may cause the parasitic torque (e.g., associated with parasitic load 240) to be increased based on the target increase to the torque output. The controller 180 may cause the parasitic torque to be increased by increasing a stroke rate of an electrohydraulic pump (e.g., parasitic load 240). The controller 180 may cause the parasitic torque to be increased without increasing a stroke rate of the engine.

In some cases, process 400 may be a loop. For example, process 400 may be a closed loop. In such cases, the controller may iteratively determine exhaust temperatures, determine whether the exhaust temperatures satisfy the threshold, and adjust the stroke rate of the electrohydraulic pump accordingly. For example, the controller may determine a second exhaust temperature after a first exhaust temperature (e.g., using sensor 230), and may adjust a parasitic torque based on a difference between the second exhaust temperature and the first exhaust temperature.

Although FIG. 4 shows example blocks of process 400, process 400 may include additional blocks, fewer blocks, different blocks, or differently arranged blocks than those depicted in FIG. 4. Additionally, or alternatively, two or more of the blocks of process 400 may be performed in parallel.

INDUSTRIAL APPLICABILITY

The above-described techniques provide regeneration of a particulate filter by managing the exhaust temperature of an engine using a parasitic torque of the engine. This may be particularly beneficial in situations when the engine cannot generate sufficiently hot exhaust using a main load of the engine, such as in low ambient temperatures or when the machine is idle. Furthermore, the above-described techniques can be performed without increasing a stroke rate of the engine, thereby improving efficiency of the regeneration process and providing maintenance of a minimum exhaust temperature for CVT or hybrid transmission engines. For example, in a CVT or hybrid engine, a stroke rate of the engine can be increased without increasing a load of the engine, so it is beneficial to maintain the minimum load (and thus the minimum exhaust temperature) using the parasitic load.

In this way, a configurable minimum load on the engine may be maintained using the parasitic torque. The parasitic torque may be added only if the actual engine load (measured based on the exhaust temperature) is less than a required load to maintain a threshold exhaust temperature. Thus, particulate filter longevity may be improved by oxidizing particulate matter using engine exhaust before an exothermic event occurs.

What is claimed is:

1. A method for operating a machine, comprising:
   determining, by a controller, an exhaust temperature of an engine operatively connected to:
   a parasitic load, and
   one of a continuously variable transmission (CVT) or a hybrid transmission,
   the parasitic load being operatively connected to an implement of the machine;
   determining, by the controller, a target increase to the exhaust temperature of the engine based on the exhaust temperature of the engine failing to satisfy an exhaust temperature threshold;
   determining, by the controller, a target increase to a torque output of the engine based on the target increase to the exhaust temperature of the engine,
   the target increase to the torque output of the engine corresponding to a target implement power; and causing, by the controller and based on the target increase to the torque output, a parasitic torque of the engine to be increased by increasing a stroke rate of the parasitic load, the parasitic torque being increased without increasing a stroke rate of the engine.

2. The method of claim 1, wherein the parasitic load is an electrohydraulic pump.

3. The method of claim 1, wherein the parasitic torque is associated with a load external to the engine.

4. The method of claim 1, wherein the exhaust temperature of the engine is measured at a diesel oxidation catalyst or a selective catalytic reducer associated with the engine.

5. The method of claim 1, wherein the parasitic torque is associated with an alternator associated with the engine.

6. The method of claim 1, wherein the increase in the parasitic torque of the engine is determined based on a minimum load of the engine needed to satisfy the exhaust temperature threshold.

7. A device, comprising:
a controller configured to:
determine an exhaust temperature of an engine operatively connected to:
a parasitic load, and
one of a continuously variable transmission (CVT) or a hybrid transmission,
the parasitic load being operatively connected to an implement of a machine;
determine a target increase to the exhaust temperature based on the exhaust temperature of the engine failing to satisfy an exhaust temperature threshold;
determine, based on a lookup table, a target increase to a torque output of the engine based on the target increase to the exhaust temperature of the engine, the target increase to the torque output of the engine corresponding to a target implement power; and
cause a parasitic torque of the engine to be increased, based on the target increase to the torque output, by increasing a stroke rate of the parasitic load,
the parasitic torque being increased without increasing a stroke rate of the engine.

8. The device of claim 7, wherein the exhaust temperature threshold is based on a temperature at which exhaust of the engine causes soot to oxidize.

9. The device of claim 7, wherein determining the target increase to the exhaust temperature of the engine is based on an indication to increase the exhaust temperature of the engine.

10. The device of claim 7, wherein the parasitic load is an implement pump.

11. The device of claim 7, wherein the exhaust temperature is measured at a diesel oxidation catalyst or a selective catalytic reducer associated with the engine.

12. The device of claim 7, wherein the exhaust temperature of the engine is a first exhaust temperature, and wherein the controller is further configured to:
determine a second exhaust temperature; and
adjust the parasitic torque based on the second exhaust temperature.

13. A system comprising:
an engine;
an electrohydraulic pump operatively connected to the engine and an implement; and
a controller configured to:
determine an exhaust temperature of the engine;
determine a target increase to a torque output of the engine based on the exhaust temperature of the engine failing to satisfy an exhaust temperature threshold,
wherein the target increase to the torque output of the engine corresponds to a target implement power, and
wherein the target increase to the torque output of the engine is based on a difference between the exhaust temperature of the engine and the exhaust temperature threshold; and
cause a parasitic torque of the engine to be increased to satisfy the target increase to the torque output by providing a command to increase a stroke rate of the electrohydraulic pump,
the parasitic torque being increased without increasing a stroke rate of the engine.

14. The system of claim 13, wherein the exhaust temperature of the engine is a first exhaust temperature, and wherein the controller is further configured to:
determine a second exhaust temperature; and
adjust the parasitic torque based on the second exhaust temperature.

15. The system of claim 13, wherein the controller, when determining the target increase to the torque output of the engine, is configured to:
determine the target increase to the torque output of the engine based on receiving an indication to increase the exhaust temperature of the engine,
wherein the indication indicates to increase a load of the engine.

16. The system of claim 13,
wherein the controller is further configured to:
determine that an exhaust temperature maintenance process is to be performed based on one or more conditions, and
wherein the parasitic torque of the engine being caused to be increased is based on the determination that the exhaust temperature maintenance process is to be performed.

17. The system of claim 16, wherein the one or more conditions include one or more of:
a first condition that the engine has requested regeneration using the electrohydraulic pump,
a second condition that the engine is operational,
a third condition that regen assist is enabled, and
a fourth condition that a diesel oxidation catalyst is operational.

18. The system of claim 13, further comprising:
one of a continuously variable transmission (CVT) or a hybrid transmission, wherein the CVT or the hybrid transmission includes a driving element that powers a driven element.

19. The method of claim 1,
wherein the parasitic load is a first pump of the machine,
wherein the CVT or the hybrid transmission includes a driving element and a driven element, and
wherein the driving element is a second pump of the machine.

20. The device of claim 7,
wherein the parasitic load is a first pump of the machine,
wherein the CVT or the hybrid transmission includes a driving element and a driven element, and
wherein the driving element is a second pump of the machine.

* * * * *